United States Patent
Willens et al.

(10) Patent No.: US 11,668,614 B2
(45) Date of Patent: Jun. 6, 2023

(54) WEARABLE UNDERWATER AND IN-AIR BLAST SENSOR

(71) Applicant: Advanced Materials and Devices, Reno, NV (US)

(72) Inventors: Kyle Willens, Carson City, NV (US); Blake Muzinich, Reno, NV (US); Barkan Kavlicoglu, Reno, NV (US); Faramarz Gordaninejad, Reno, NV (US)

(73) Assignee: Advanced Materials and Devices, Inc., Reno, NV (US)

( * ) Notice: Subject to any disclaimer, the term of this patent is extended or adjusted under 35 U.S.C. 154(b) by 0 days.

(21) Appl. No.: 17/724,010

(22) Filed: Apr. 19, 2022

(65) Prior Publication Data
US 2023/0050377 A1 Feb. 16, 2023

Related U.S. Application Data

(60) Provisional application No. 63/231,371, filed on Aug. 10, 2021.

(51) Int. Cl.
*G01L 19/14* (2006.01)
*G01L 5/14* (2006.01)

(52) U.S. Cl.
CPC .............. *G01L 5/14* (2013.01); *G01L 19/147* (2013.01); *G01L 19/149* (2013.01)

(58) Field of Classification Search
None
See application file for complete search history.

(56) References Cited

U.S. PATENT DOCUMENTS 3,499,311 A * 3/1970 Johnl .................. G01L 23/00
73/35.16
6,032,538 A * 3/2000 Rickman ............. G01L 19/0636
73/756

(Continued)

OTHER PUBLICATIONS

Helen Phipps et al., Characteristics and Impact of U.S. Military Blast-Related Mild Traumatic Brain Injury: A Systematic Review; Frontiers in Neurology, Nov. 2020, vol. 11, Article 559318.

(Continued)

*Primary Examiner* — Brandi N Hopkins
*Assistant Examiner* — Nigel H Plumb
(74) *Attorney, Agent, or Firm* — Kenneth D'Alessandro

(57) ABSTRACT

A wearable universal blast sensor includes an underwater pressure sensing transducer and at least one blast parameter sensing transducer to measure a blast parameter from the blast other than pressure, an analog-to-digital converter having an analog input and a digital output, the analog input coupled to the pressure sensing transducer and a digital output, a rolling memory buffer coupled to the digital output of the analog-to-digital converter, at least one controller coupled to the rolling memory buffer and configured to store a time sequence of digital pressure signals from the digital output of the analog-to-digital converter, write into a blast event memory data from the rolling memory buffer including data corresponding to the blast event if one of the digital pressure signals exceeds a set first threshold, generate a first blast magnitude indicator signal if any of the digital pressure signals exceeds a second set threshold.

24 Claims, 6 Drawing Sheets

(56) References Cited

U.S. PATENT DOCUMENTS

| | | | | |
|---|---|---|---|---|
| 7,162,919 | B1* | 1/2007 | Randolph | G01L 5/14 73/35.14 |
| 7,992,421 | B2* | 8/2011 | Jeftic-Stojanovski | A42B 3/046 73/12.04 |
| 8,984,664 | B2 | 3/2015 | MOss | |
| 9,568,389 | B2* | 2/2017 | Wong | G01L 23/00 |
| 2010/0275676 | A1* | 11/2010 | King | G01L 5/14 73/35.14 |
| 2010/0326192 | A1* | 12/2010 | Petelenz | G01L 5/0052 73/862.51 |
| 2015/0143875 | A1* | 5/2015 | Wong | G01L 23/00 73/35.14 |
| 2016/0027275 | A1* | 1/2016 | Bernhardt | G08B 21/02 340/665 |
| 2016/0097756 | A1* | 4/2016 | Borkholder | G09B 19/00 73/35.15 |

OTHER PUBLICATIONS

Ann McKee et al., Military related traumatic brain injury and neurodegeneration, Alzheimer's & Dementia: the Journal at the Alzheimer's Association, Jun. 2014, pp. S242-S251.

* cited by examiner

WEARABLE UNDERWATER AND IN-AIR BLAST SENSOR

This invention was made with government support under contract No. W81XWH-18-C-0304 awarded by US Army Medical Research ACQ Activity. The government has certain rights in the invention.

BACKGROUND

In-air and underwater explosions can cause bodily and nerve system injuries. Traumatic Brain Injury (TBI) and Post-Traumatic Stress Disorder (PTSD) are well known blast-related injuries. Lung and other internal organ injuries are other types of polytrauma sustained by persons exposed to blast. Wearable blast sensors that measure and record in-air blast pressure exposure on personnel, animals, structures, and vehicles is limited. Underwater explosions differ in injury mechanisms when compared to in-air explosions since an underwater blast wave propagates faster and farther which can cause more severe injuries when compared to an equivalent in-air explosion. Currently, the underwater measurement of blast pressure is limited to laboratory sensors that can be operated by experts in the field. These sensors are bulky, wired and not wearable. For underwater blast pressure exposure, no wearable sensor exists. A single sensor that can measure and record in-air and underwater blast exposure simultaneously, does not exist.

Prior-art devices have been developed to be worn on personnel and attached to structures and vehicles for in-air blasts only, but widespread adoption has yet to be achieved due to technical shortcomings. Prior-art devices used to measure in-air blasts have had high directional sensitivity, insufficient sampling rates, low resolution, and poor ingress protection. Prior-art devices for in-air blasts such as U.S. Pat. No. 9,568,389 operate at insufficient sampling frequencies (as low as 24 kHz) to capture enough fidelity of blast pressure data to accurately capture peak pressure and pressure impulse.

Additionally, the power conservation operational mode used for long field deployments to capture exposure data is not appropriate for capturing data for blast wave recording. U.S. Pat. No. 9,568,389 relies on powering a low-power accelerometer with logic to wake up the higher power pressure sensor upon exceeding 10 g of acceleration produced from a blast event. With a 24 kHz sampling rate and the latency involved with powering up the pressure sensing element and circuitry, accurately capturing the near-instantaneous pressure rise of a blast event for pressure recording and impulse calculation is not possible. The present invention, a wearable universal blast sensor (UBS), is designed to be wearable, lightweight, rechargeable, rugged, and collect accurate data for underwater and in-air blast events.

BRIEF SUMMARY OF THE INVENTION

In accordance with an aspect of the present invention, a wearable universal blast sensor (UBS) has the ability to measure both underwater and in-air blast pressures, in a single device. The wearable UBS has multiple built-in sensitivities to measure various amplitudes of underwater and in-air blast pressures.

According to another aspect of the invention, one parameter sensed from a blast is pressure.

According to another aspect of the invention, one parameter sensed from a blast is acceleration.

According to another aspect of the invention the wearable UBS is to trigger recording once at least one predetermined threshold parameter of a blast is reached either with a traditional trigger or artificial intelligence/machine learning-based trigger.

According to another aspect of the invention, the wearable UBS utilizes a rolling memory buffer to capture pre and post-trigger blast data.

According to another aspect of the invention, the wearable UBS indicates/displays the level of blast exposure based on at least one parameter of a blast with at least one colored indicator light, and/or a digital display, and/or a sound source, and/or a tactile feedback source present on the invention with thresholds either preprogrammed by the user or set from the factory.

According to another aspect of the invention, the wearable UBS saves data measured by at least one sensor for at least one parameter of the blast wave to be downloaded by another device for post-processing.

According to another aspect of the invention, blast data is processed on the device (i.e., computing at the edge).

According to another aspect of the invention, the wearable UBS measures at least one parameter of blast wave data in-air and/or underwater with no appreciable loss in fidelity when in different mediums.

According to another aspect of the invention, the reduction of false blast event is accomplished utilizing artificial intelligence/machine learning algorithms that arc trigger based on a parameter(s) of a blast wave.

Using a wearable UBS in accordance with the present invention, medical professionals can have access to accurate blast pressure exposures input to generate a medical database correlating the long-term effects of blast exposure on individuals. The wearable UBS is accompanied by a software tool that provides blast overpressure histograms, peak pressures, blast pressure impulses, acceleration histograms, peak accelerations, and other statistics of a recorded blast event.

The recording of blast events is triggered by at least one sensor based on predetermined thresholds preprogrammed by the user or set from the factory for at least one parameter of a blast wave. Other methods of triggering blast event recording can include artificial intelligence/machine learning based on a parameter of a blast.

BRIEF DESCRIPTION OF THE DRAWING FIGURES

DETAILED DESCRIPTION

Persons of ordinary skill in the art will realize that the following description is illustrative only and not in any way limiting. Other instances of the invention will readily suggest themselves to such skilled persons.

The present invention is particularly useful for sensing and recording parameters of an underwater and/or an in-air blast event, indicating the severity of the event, and storing the data for post-event analysis. The wearable UBS includes at least one pressure sensing element and at least one accelerometer. In instances of the invention both at least one underwater pressure sensor and one in-air pressure sensor will be employed, making the device a universal blast sensor. The pressure signals are conditioned and then processed with a microcontroller (MCU). The amplitude and time history of pressure sensing elements and at least one other sensing element to measure a parameter such as acceleration is used for the calculation of a blast severity metric, such as pressure impulse. In a fixed power operation mode, power is continually provided to all pressure sensors and the system power can be supplied from a wired power supply or the battery. In a battery operation mode, the MCU in the wearable UBS wakes up in response to a signal from an activation sensor indicating that the wearable UBS is being worn by a user or moving in a vehicle and power is provided to all pressure sensors. While the MCU is active, output data from all sensors is written into a rolling memory buffer. After a blast is sensed, the recorded blast data can be processed in the MCU or can be downloaded and post-processed after the event to determine the blast exposure severity. The quantitative amplitude of at least one blast parameter can be displayed with an indicator light and/or a digital display. The maximum pressure recorded by any of the pressure sensing elements (or an average of any combination, or all measured pressures), may be displayed.

Processed data is recorded to a blast event memory which can be written to and read via either wired or wireless communication. In some instances of the invention, the blast event memory is co-located within the housing of the wearable UBS. In other instances of the invention, the blast event memory is located outside of the housing of the wearable UBS. Power consumption of the wearable UBS is minimized by utilizing low-power modes on the MCU and powering the pressure sensors only when the wearable UBS is in use.

The pressure history of all pressure sensing elements in the wearable UBS as well as the data history from other sensors in the wearable UBS is analyzed and, at a minimum, the peak pressure and pressure impulse from all pressure sensors are calculated. A resultant pressure of the blast with respect to the wearable UBS can be determined with an analysis of the pressure history of each pressure sensor.

Figure 1:
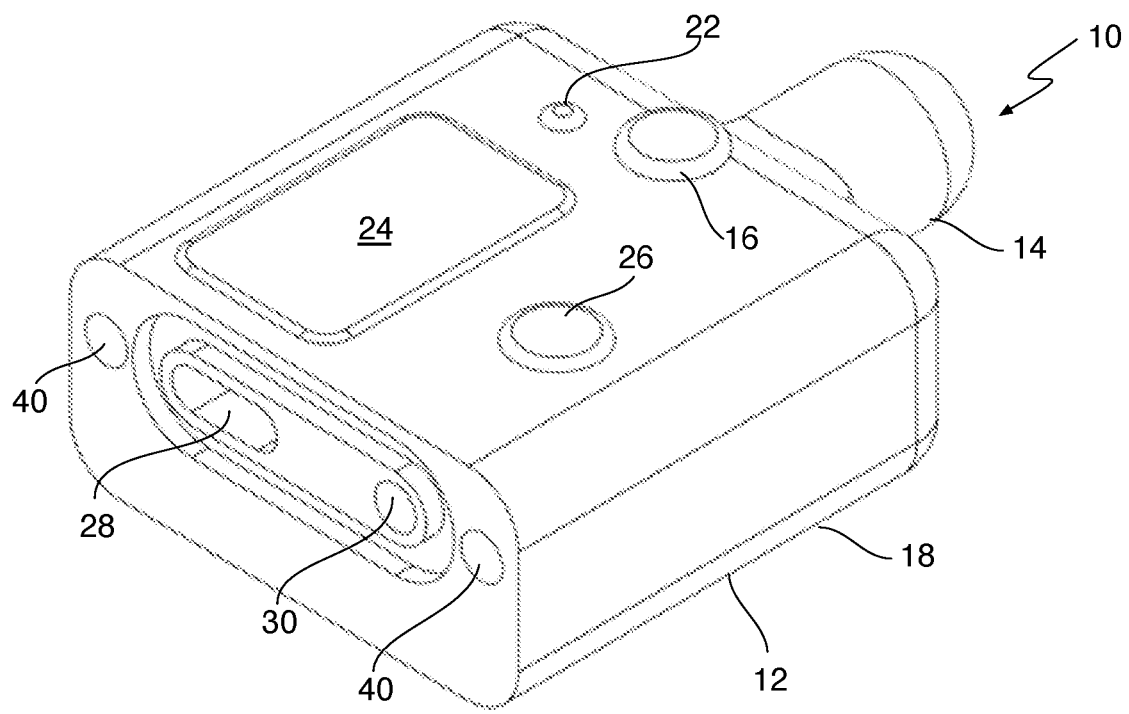
FIG. 1 is an isometric view illustrating an example instance of the universal blast sensor that is used for sensing blast pressure and acceleration.
Figure 2:
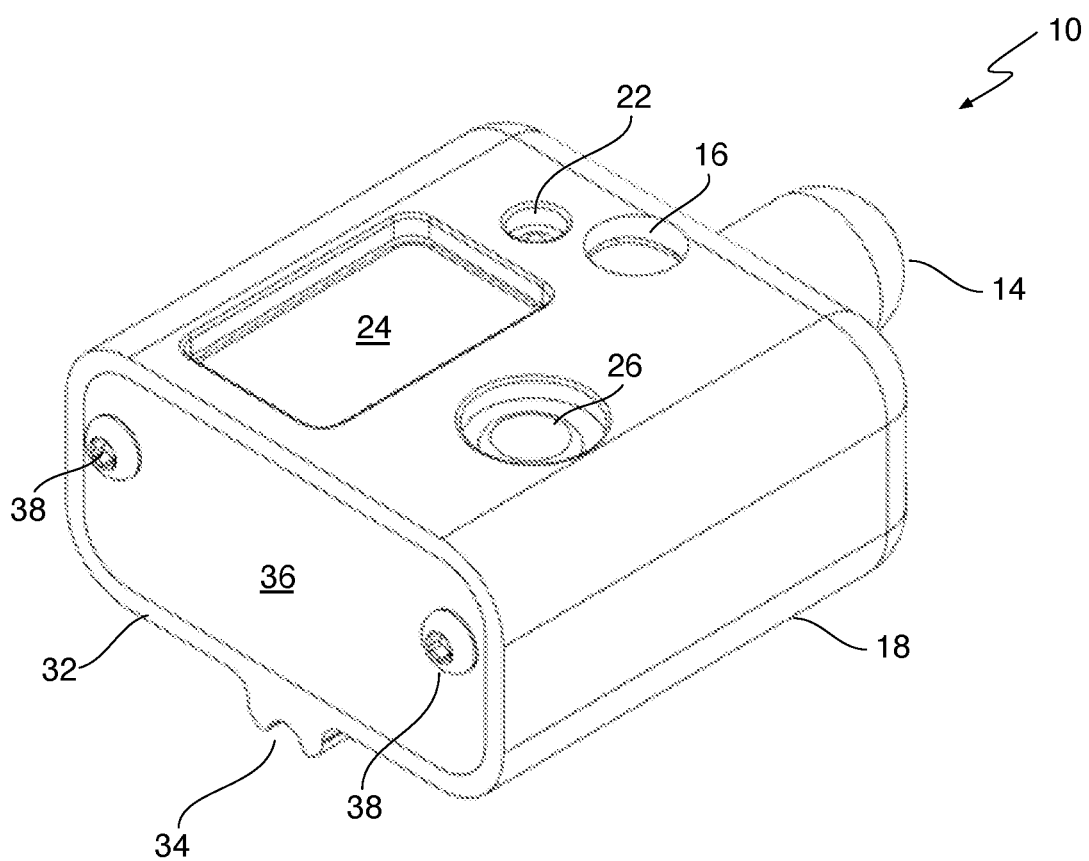
FIG. 2 is a top view of the universal blast sensor of FIG. 1 that is used for sensing blast pressure and acceleration.

An illustrative instance of the wearable UBS 10 of the present invention is shown in an isometric view in FIG. 1 and in a top view in FIG. 2. The wearable UBS 10 is disposed in a housing 12 formed from a rugged and waterproof material that can be, for example, directly molded over all electronics components and sensors, attached and sealed via ultrasonic welding or other methods, bolted with sealing gaskets or a seal system, glued with adhesive, or sealed with an interference or snap-fit.

As may be seen from the illustrative instance of the wearable UBS 10 of the present invention shown in FIGS. 1 and 2, the wearable UBS 10 includes both at least one underwater pressure sensor 14 and an in-air pressure sensor 16 to capture blast pressure from both in-air blasts and underwater blasts. Other instances of the invention may include additional underwater pressure sensors (indicated at reference numeral 18 within dashed lines in FIG. 5). The first underwater pressure sensor 14 senses a first range of pressure (e.g., 0-100 psi) and the additional underwater pressure sensor 18 senses a second range of pressure larger than the first range (e.g., 1-1,000 psi). Any pressure sensor can be conditioned with multiple gains to achieve multiple sensitivities from a single sensor. The underwater pressure sensing element 14 may be formed from a hydrostatically sensitive piezoelectric material such that it can sense hydrostatic pressure. The symmetry of the sensing element minimizes the effect of change of orientation with respect to the underwater blast source; i.e., since the sensor is nearly symmetrical, the transit time of a blast wave is nearly the same regardless of the direction from which it comes. The underwater sensor may have in-air sensing capabilities when the calibration constant compensates for the change in fluid mediums.

The in-air pressure sensing element 16 can be made of various materials and/or micro-electromechanical systems (MEMS) including, but not limited to, a piezoelectric, piezoresistive, capacitive, diaphragm, or strain-gage based sensing element(s). When using only one air sensing element, the air sensing capability of the wearable UBS is unidirectional and the pressure amplitude sensed will change with respect to the orientation of the blast source. This effect may be minimized if additional air sensors are included and oriented in orthogonal planes.

The material surrounding the in-air pressure sensor and the underwater pressure sensor should have an acoustic impedance that minimally impedes the blast pressure propagation to the pressure sensor and limits electromagnetic interference and other noise to the sensor. Materials which have these characteristics may be of a metallic, polymeric (e.g., polyurethane), or composite materials type.

A blast indicator 22 provides a sensory indication that a blast has been sensed. The sensory indication may be one or more of visual, audible or tactile in the form of, for example, a light emitting diode (LED), a sound such as an audible beep or buzzer, or a mechanical impulse or vibration. In some instances of the invention, the sensory indication may be a multi-level sensory indication to indicate the severity of the blast. In one non-limiting instance of the invention, three blast severity levels may be represented by, for example, display of a different color (e.g., red, green, blue, (RGB) LED) or short, medium or long blinking, different sound characteristic (e.g., one, two, or three, or short, medium or long audible beeps or buzzes), or different mechanical vibration characteristic (e.g., one, two, or three, or short, medium or long mechanical vibrations) as a function of the amplitude of at least one parameter measured from at least one sensing element during a blast event. The different sensory indications which correspond to different levels of at least one sensed blast parameter amplitude can be programmed and set by the user, or preprogrammed as shipped from the factory. A digital display 24 can indicate and display blast exposure amplitude along with other information such as battery life, UBS mode, and sensor states. An on/off button switch 26 is used for powering the sensor on and off, or for switching between different operating modes. Operating modes can also be switched automatically when a threshold of at least one blast parameter is exceeded to minimize power consumption. The housing 12 contains a USB port 28 for the wired USB connection to the sensor. A reset button switch 30 may be provided to reset the wearable UBS 10.

As shown in FIG. 2, the wearable UBS 10 can be placed in a modular holder 32 which may be used to provide an attachment point 34 for the wearable UBS 10. The modular holder 34 does not interfere with the response of the wearable UBS 10, nor does it block output from the blast indicator 22, the digital display 24, or prevent operation of the on/off switch button 26. The modular holder 32 can be attached to the sensor with a slip fit, interference fit, snap-fit, press-fit, adhesive, hook and loop fasteners, or mechanical fasteners. The modular holder 32 can also be directly molded over the housing 12. The modular holder 32 can include attachment points to the sensor for different mounting options such that the wearable UBS 10 can be mounted with straps, zip-ties, hook and loop, adhesives, or other mechanical attachment methods. A waterproof sealing door 36 may be bolted to the housing 12 (as seen in FIG. 1).

Figure 3:
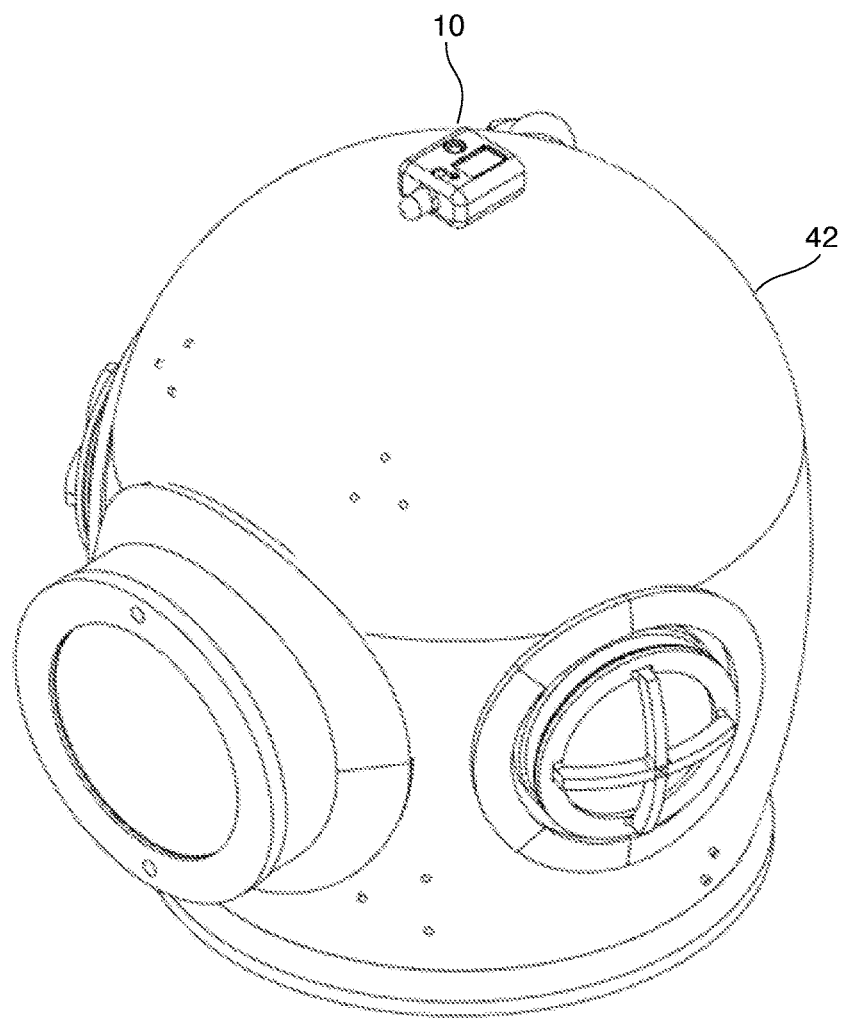
FIG. 3 is an isometric view of the universal blast sensor of FIG. 1 mounted on an underwater object in the form of a diving helmet.

The wearable UBS 10 can be attached to an object such as, but not limited to a human or animal body, ship hull, underwater vehicle or structure using adhesive, hook-and-loop fastener, straps, elastic ties, mechanical fasteners, or other attachment methods. As used herein the phrase an "underwater object" shall be construed to mean any object that can be placed underwater, including but not limited to a human or animal body, ship hull, underwater vehicle or underwater structure. As a non-limiting example, FIG. 3 is an isometric view that shows the wearable UBS 10 attached to an underwater object in the form of a diving helmet 42.

Figure 4A:
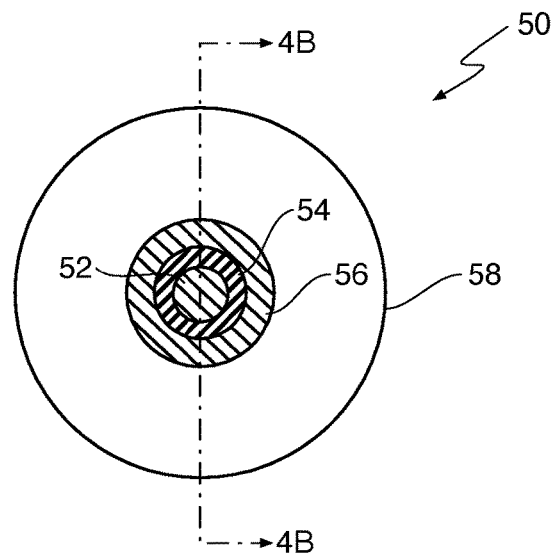
FIG. 4A is a top view of an example instance of an underwater pressure sensor that may be employed in the universal blast sensor of the present invention.
Figure 4B:
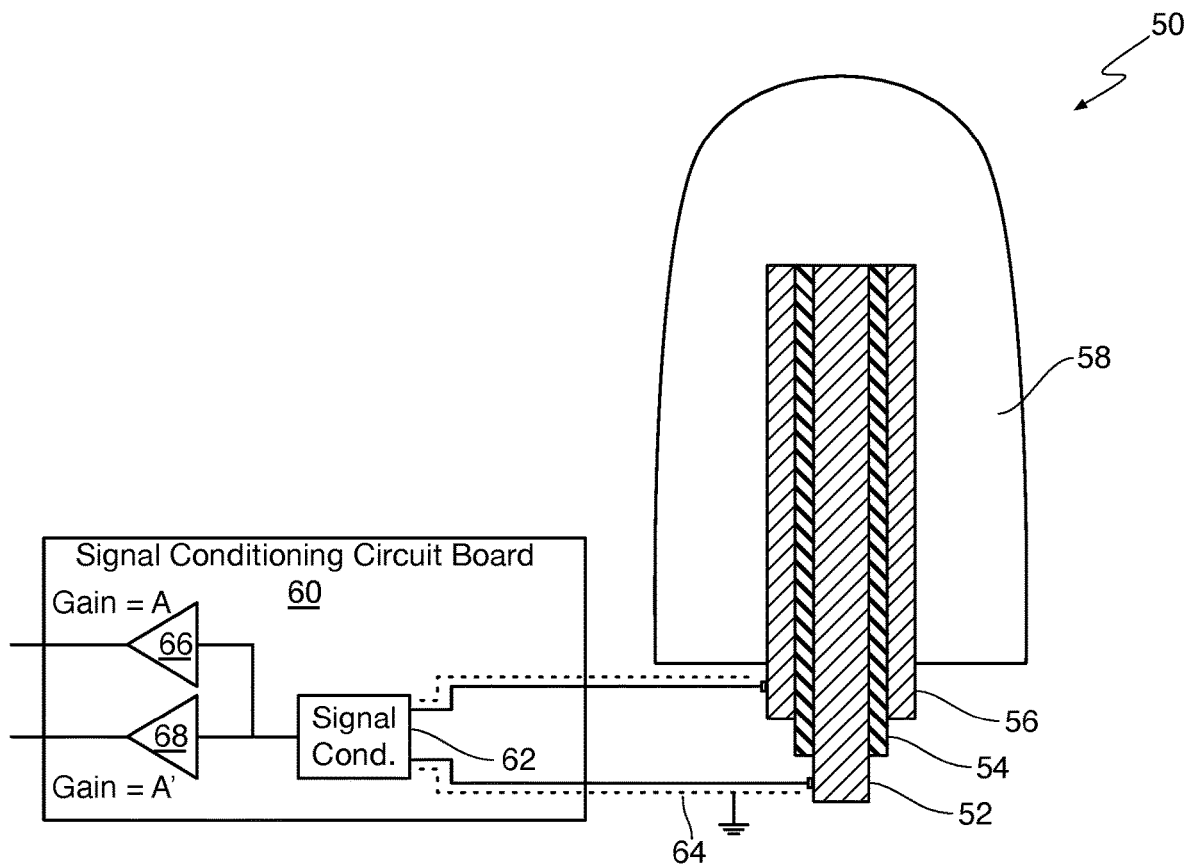
FIG. 4B is a cross-sectional view of the underwater pressure sensor of FIG. 4A taken through lines 4B-4B of FIG. 4A.

Referring now to FIG. 4A and FIG. 4B, an example instance is shown of an underwater pressure sensor 50 that may be employed in the wearable UBS 10 of the present invention. FIG. 4A is a top view of the example instance of the underwater pressure sensor 50 and FIG. 4B is a cross-sectional view of the underwater pressure sensor of FIG. 4A taken through lines 4B-4B.

The underwater pressure sensor 50 includes a first conductive electrode 52. In the instance of the underwater pressure sensor 50 shown in FIG. 4A and FIG. 4B, the first conductive electrode is completely surrounded by a layer of piezoelectric material 54 and a second conductive electrode 56 completely surrounds the layer of piezoelectric material 54. The first conductive electrode 52, the layer of piezoelectric material 54 and the second conductive electrode 56 together form the pressure sensing element. In the instance of the invention shown in FIG. 4A and FIG. 4B, the first conductive electrode 52, the layer of piezoelectric material 54 and the second conductive electrode 56 are cylindrical in shape, but persons of ordinary skill in the art will immediately comprehend that the particular geometry configuration shown in FIG. 4A and FIG. 4B is not necessarily the only possible configuration.

In one example instance of the invention, the center conductor first conductive electrode 52 is typically 0.04 inch thick copper. The piezoelectric film 54 can be in the range of about 0.002-0.005 inches (2-5 thousandths) thick. The outer conductor second conductive electrode 56 can be in the range of about 0.01-0.06 inches. These elements can all be enclosed in a jacket, similar to a coaxial wire, made of polyethylene or similar material. The sensor can work with or without the outer jacket, and persons of ordinary skill in the art will appreciate that the material system as a whole affects the sensitivity in v/psi calculated during calibration. The length of the sensor directly affects the sensitivity as the longer the sensor is, the more sensitive it is. In the present invention, a sensing element length of 0.25" has been effective to accurately sense pressure waves. As the length of the sensing element increases, signal output due to bending stress becomes more prevalent and vibration may show up in the pressure sensing response. Furthermore, as the length increases, the symmetry of the sensing element decreases such that a pressure wave has to travel a longer distance, and thus time, when directed at the length of the sensing element.

The underwater pressure sensor 50 is encapsulated in a layer of encapsulating material 58 having an acoustic impedance similar to that of the medium in which it is sensing. Thermosetting or thermoforming polymers having a Shore Hardness in the range of about 30-80 A can have an acoustic impedance close to that of water and are thus useful to employ where the medium in which pressure is to be sensed is water. In one example instance of the present invention, a thermosetting polyurethane may be used as the layer of encapsulating material 58. In other instances of the invention, the pressure sensing element can be surrounded by a fluid, which may be a non-conductive fluid such as silicone oil, and encapsulated in a polymer-type boot to provide a very close acoustic impedance match to water. Other materials of a metallic or composite materials type such as but not limited to metals such as aluminum, steel, titanium, copper, and advanced composites such as carbon fiber composite, or fiberglass composites may be used as the layer of encapsulating material 58, and can be attached via press fit, snap fit, adhesive, or other methods. As the impedance mismatch of the material compared to the medium increases, the sensitivity of the pressure sensing element will be negatively affected by reflection of pressure wave at the interface, i.e., a metallic material will reflect more of the pressure wave although some of the pressure wave will propagate through. In all instances, the sensitivity of the sensing element, in voltage/pressure, can be determined using a straightforward calibration procedure.

In the present invention, the layer of material 58 is directly molded over the piezoelectric sensor, but it may be attached by other means such as a snap fit, press fit, adhesive, or others. The layer of piezoelectric material 54 in the form of a piezoelectric film is wrapped around the first conductive electrode 52 in the form of a center conductor 2 and the second conductive electrode 56 in the form of an outer conductor is wrapped around the layer of piezoelectric material 54. As depicted in FIG. 4B, the first conductive electrode 52 and the second conductive electrode 56 may then be wired or directly soldered to a circuit board 60 that may also include a signal conditioning circuit 62. A layer of shielding such as is employed in coaxial communications cables (shown at dashed lines 64) may also be placed around the outer conductor and grounded to prevent electronic or other noise. The signal conditioning circuit converts the charge produced from the piezoelectric film to voltage, may provide some noise filtering, and provides a gain A as shown by amplifier symbol 66. The initially conditioned and amplified voltage may also be fed to another gain amplifying circuit 68 that provides a gain A' higher than A to achieve a second higher sensitivity pressure sensing range. Alternately, amplifier 66 may be configured as a programmable gain amplifier.

Persons of ordinary skill in the art will appreciate that the underwater pressure sensor 50 may also be used to measure in-air blast pressure. When the underwater pressure sensor 50 is used to measure in-air blast pressure its calibration will be changed to accommodate the differences between in-air and underwater sensing.

Figure 5:
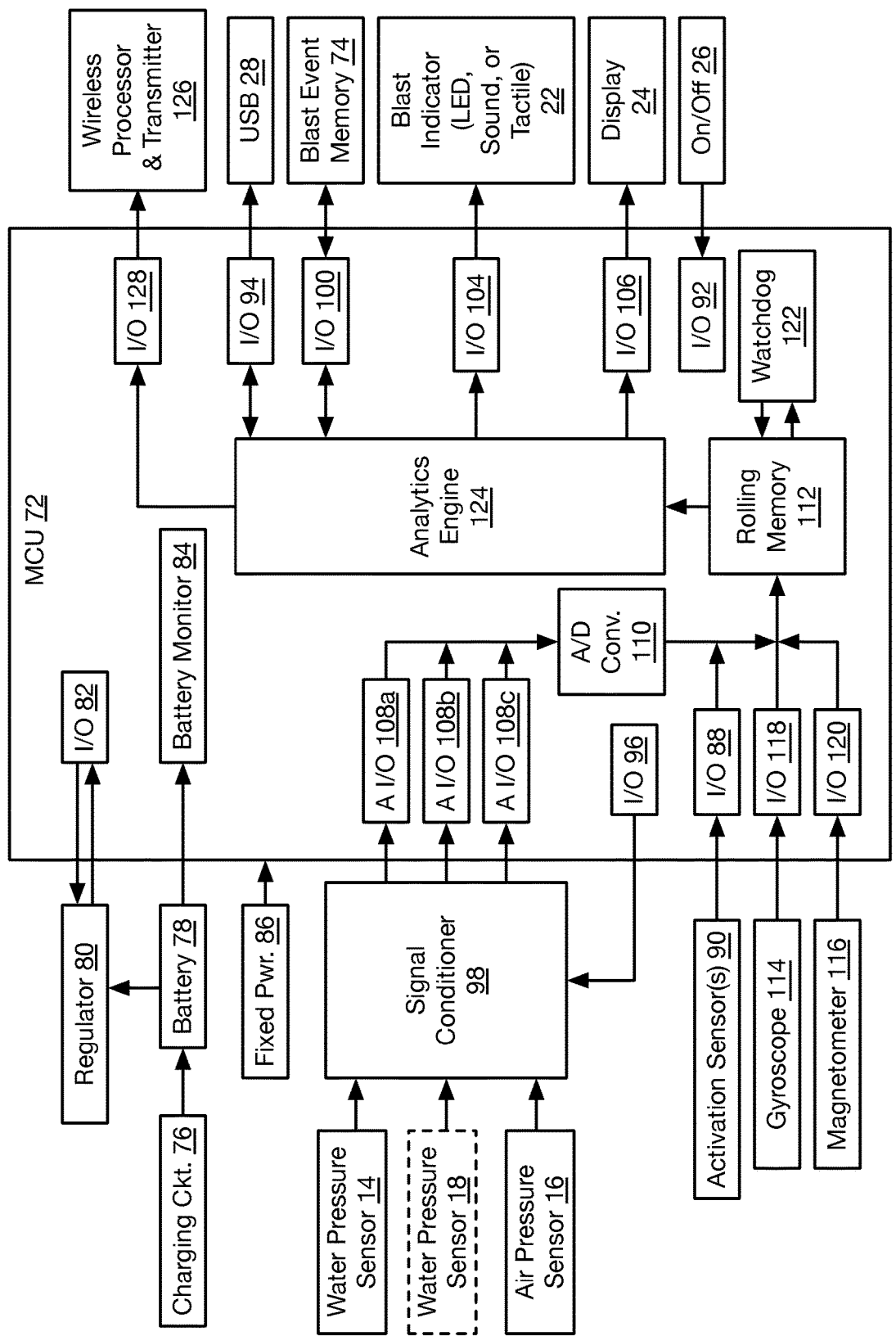
FIG. 5 is a block diagram showing illustrative electronic circuitry of a universal blast sensor in accordance with an aspect of the invention.
Figure 6:
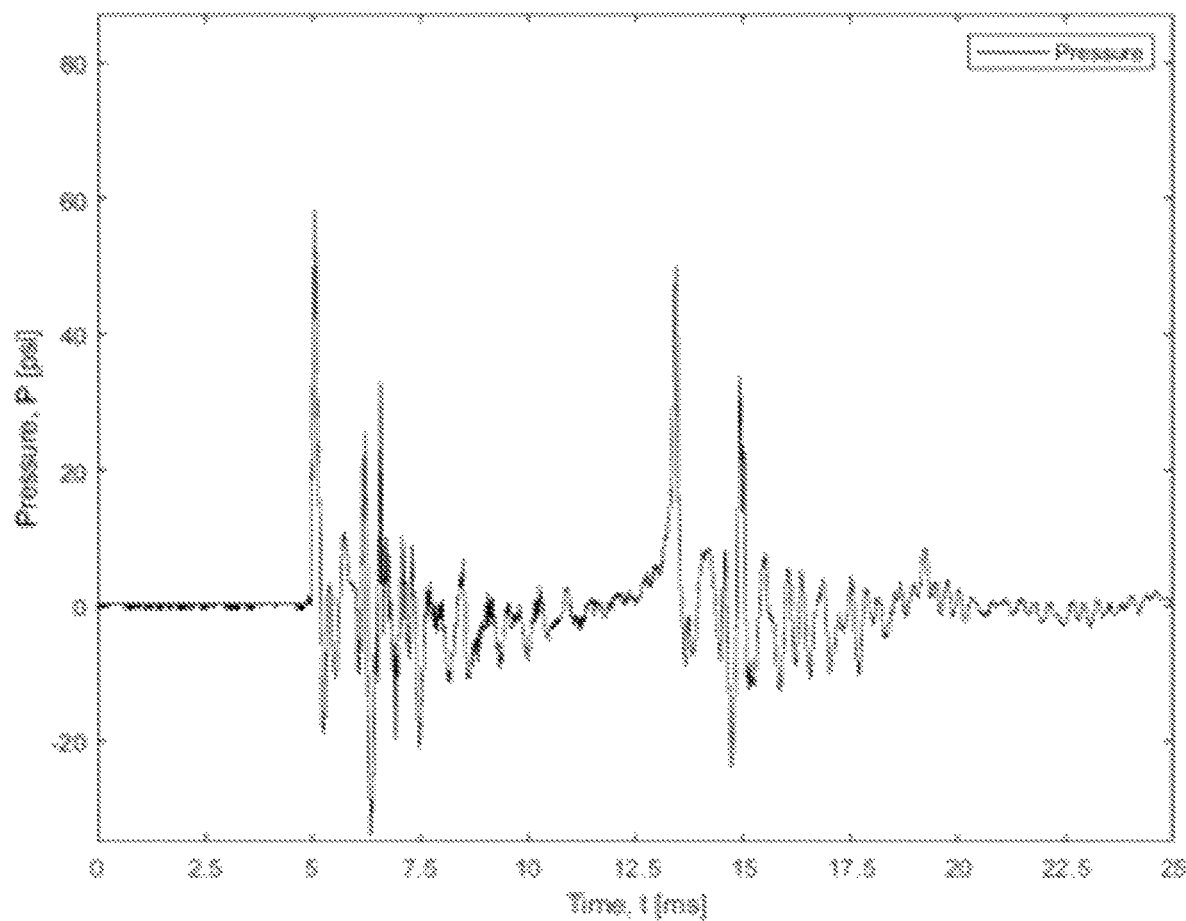
FIG. 6 is a graph of pressure vs. time that shows a sample blast pressure history from one blast event recorded from the UBS by a single underwater blast sensor in accordance with an aspect of the present invention.

Referring now to FIG. 5, a block diagram shows electrical components contained in the wearable UBS 10 in accordance with an illustrative instance of the invention. The microcontroller (MCU) 72 processes and records sensor data to blast event memory 74 and communicates with external devices through digital I/O ports as is known in the art. A charging circuit 76 is used to charge a rechargeable battery 78. As is known in the art, charging can be performed using wired chargers or by wireless inductive charging. A voltage regulator 80 is coupled between the battery 78 and the MCU 72 for regulating the voltage powering the MCU 72. The regulator 80 can be turned on and off using signals from the digital input/output (I/O) 82 for power savings when the sensor is in a low-power sleep operation. Battery voltage is monitored through a battery monitor 84 which is internal of the MCU 72.

In some instances of the invention, a fixed power source 86 may be employed. The wearable UBS 10 can be set into a fixed power mode, such that the activation sensor (accelerometer) timeout is inactive and all sensors are fully powered at all times. This mode can be set by button press sequence, acceleration sensing of tap or double tap events, magnetic switching, a wireless command, or other means of inputs. The power can be supplied through the fixed power source 86, or from the battery 78. The fixed power mode can be used while being worn, when the sensor is placed on inanimate objects, or in research type testing.

Digital I/O 88 conveys the output of the activity sensors (triaxial accelerometers) 90 to the MCU 72. Digital I/O 92 is coupled to the On/Off switch 26 (FIGS. 1 and 2). Digital I/O 94 provides a USB interface port 28 (FIGS. 1 and 2). Digital I/O 96 communicates with the signal conditioner 98. Digital I/O 100 communicates with the blast event memory 74. Digital I/O 104 controls the blast indicator 22, which may be a RGB LED. Digital I/O 106 drives the digital display 24.

When power is supplied by a battery 78, the MCU 72 may be maintained in a low power operating mode until output from the activation sensor 90, (which in one instance of the invention is a triaxial (X, Y, and Z) accelerometer), exceeds a turn-on threshold to trigger an interrupt, indicating that the object to which the wearable UBS 10 is attached is in use. As long as the output from the activation sensor 90 indicates that the wearable UBS 10 is in use, power is supplied to the signal conditioner 98 through the digital output 96 to power and condition the outputs of the pressure sensors 14, 16, and 18 (if used) by amplifying the voltage outputs and applying analog noise filtering below, for example 200-300 Hz. In some instances of the invention, a single underwater pressure sensor 14 may be employed and the signal conditioner 98 can apply different gains to a programmable gain amplifier to increase the dynamic range of the output signal from the underwater pressure sensor 14 in the wearable UBS 10 (see discussion of FIGS. 4A and 4B).

If the output from the activation sensor 90 falls below a threshold (which may or may not be the same as the turn-on threshold) for a predetermined period of time indicating that the wearable UBS is not being worn by an active user, the MCU 72 will enter the low power operating mode, and power to the signal conditioner 98 is turned off In one illustrative but non-limiting instance of the invention this predetermined period of time may be 10 minutes. This parameter is a design-dependent variable that can be specified by the system designer.

The signals from the pressure sensors are conditioned by the signal conditioner 98 to provide individual analog voltages through analog I/O circuits 108a through 108c to the A/D converter 110 in the MCU 72 which converts them to digital values. In one instance of the invention, a 12-bit A/D converter may be used. In instances of the invention, the sampling rate for each pressure sensor can be between 50 KHz and 2 MHz or higher limited by the conversion speed of the A/D converter 110. In one non-limiting instance of the invention, a sampling rate of 400 KHz has been used. The conditioned digitized values representing the outputs of the pressure sensors are clocked into a continuous rolling memory buffer 112 which in one instance of the invention may be a FIFO buffer. In other instances of the invention the rolling memory buffer can be a clocked RAM whose highest address value rolls over to zero.

Acceleration readings can be translational and rotational from both accelerometers (e.g., three-axis accelerometers) and gyroscopes 114 (e.g., three-axis gyroscopes). The output of the gyroscope 114 can also be used in place of or in addition to the accelerometer 90 as an activation sensor to wake up the MCU 72. A magnetometer 116 may be included to provide compass orientation data. The outputs of accelerometers 90, gyroscopes 114, and magnetometers 116 are typically digital and the I/O circuits 88 (accelerometer), 118, (gyroscope) and 120 (magnetometer) may implement suitable digital communication protocols for such digital signals, such as but not limited to I2C bus circuits. In example instances of the invention, the sample rate for the gyroscopes 114 and magnetometer 116 is lower and in one example is 2K samples/sec.

The conditioned digitized values output by the A/D converter 110 representing the outputs of the pressure sensors are monitored by a watchdog 122, which may be, for example, a digital comparator. If one of the conditioned digitized values exceeds a preset threshold, indicating that a blast event has occurred, an interrupt is triggered, and the contents of the continuous rolling memory buffer are written into blast event memory 102. In some instances of the invention, the threshold may be factory set or user set. Use of the watchdog 122 and rolling memory buffer 112 allows data digitized before, during, and after the interrupt trigger event to be captured. If the preset threshold value of pressure is exceeded, the blast indicator 22 can generate one of a plurality of visual, audible, or tactile outputs to indicate the amplitude of pressure. The use of a multi-color LED allows multiple pressure thresholds to be set. If the preset threshold value of pressure is exceeded, the blast indicator 22 can illuminate any one of three colors, or any combination of the three colors, to indicate the amplitude of pressure. If the preset threshold value of pressure is exceeded, the blast indicator 22 can generate one of a plurality of visual, audible, or tactile outputs to indicate the amplitude of pressure. The use of plurality of visual, audible, or tactile outputs to indicate the amplitude of pressure allows multiple pressure thresholds to be set. Persons skilled in the art will appreciate that a light source providing a larger or smaller number of colors could be employed. The particular ones of the plurality of visual, audible, or tactile outputs which correspond to selected amplitude(s) can be set by the user or preprogrammed by the factory. The voltage signal from the pressure sensors is converted to pressure by using a conversion constant determined during the calibration of the pressure sensors and may be displayed on the digital display 24. Data that is recorded on the wearable UBS 10 can be analyzed internally using the analytics engine 124 in the MCU or can be retrieved using the USB interface 28 or by wireless communication protocols.

In some instances of the invention, a combination of three independent accelerometers oriented orthogonal to each other or a triaxial accelerometer (3d accelerometer, 3-axis accelerometer) is used to measure translational acceleration in the x, y, and z axes. As noted, a combination of three independent gyroscopes oriented orthogonal to each other or a triaxial gyroscope (3d gyroscope, 3-axis gyroscope shown at reference numeral 114 connected through I/O 118) may be used to measure rotational acceleration around the x, y, and z axes. Persons of ordinary skill in the art will appreciate that an inertial measurement unit (IMU) may be used in place of independent accelerometers and gyroscopes to measure triaxial translational and rotational acceleration of the wearable UBS 10.

The magnetometer shown at reference numeral 116 which may be connected through I/O 120 can be used to measures orientation of the wearable UBS 10 with respect to true north. The magnetometer 116 provides the information to determine which way the wearable UBS 10 was pointed during a blast event which can be used to calculate the direction of the blast pressure source and/or the direction the wearer was oriented in during the blast event.

All sensor readings are processed in the analytics engine 124. This can include calculations to drive the blast indicator 22 and display 24. The data may be transferred under the control of analytics engine 124 (or by another engine within the MCU 72) via the USB connection 28 or through a wireless processor and transmitter 126 connected through I/O 128 for further post processing or viewing.

A sample of blast pressure data recorded on the wearable UBS 10 is shown in FIG. 5. Persons of ordinary skill in the art will observe that the pressure shown on the Y Axis of FIG. 5 has been normalized to zero. The total elapsed time on the X axis is 25 mSec. Note that the pre-blast stable pressure is shown for a period of about 5 mSec.

Figure 7:
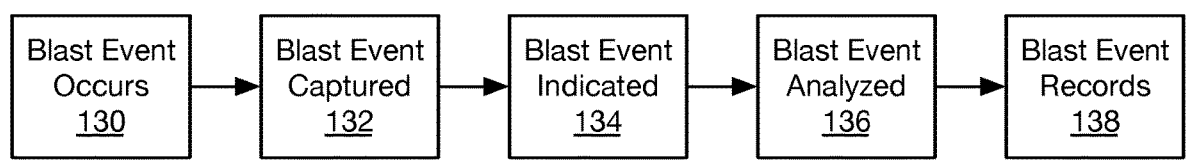
FIG. 7 is a diagram that illustrates the concept of operations of the universal blast sensor.

Referring now to FIG. 7, the concept of operation for the wearable UBS 10 is illustrated. A blast event 130 occurs and the wearable UBS 10 captures blast parameters from pressure sensors at 132. The amplitude of blast exposure from either pressure or acceleration is indicated/displayed on the wearable UBS 10 with a light and/or digital display at 134. Recorded blast data is retrieved via wired or wireless communication and processed at 136 by the MCU or post-processed with blast analysis software on a separate device. The blast analysis software analyzes the recorded blast parameters and calculates the severity of the blast exposure. The analyzed data can be stored in records at 138.

Figure 8:
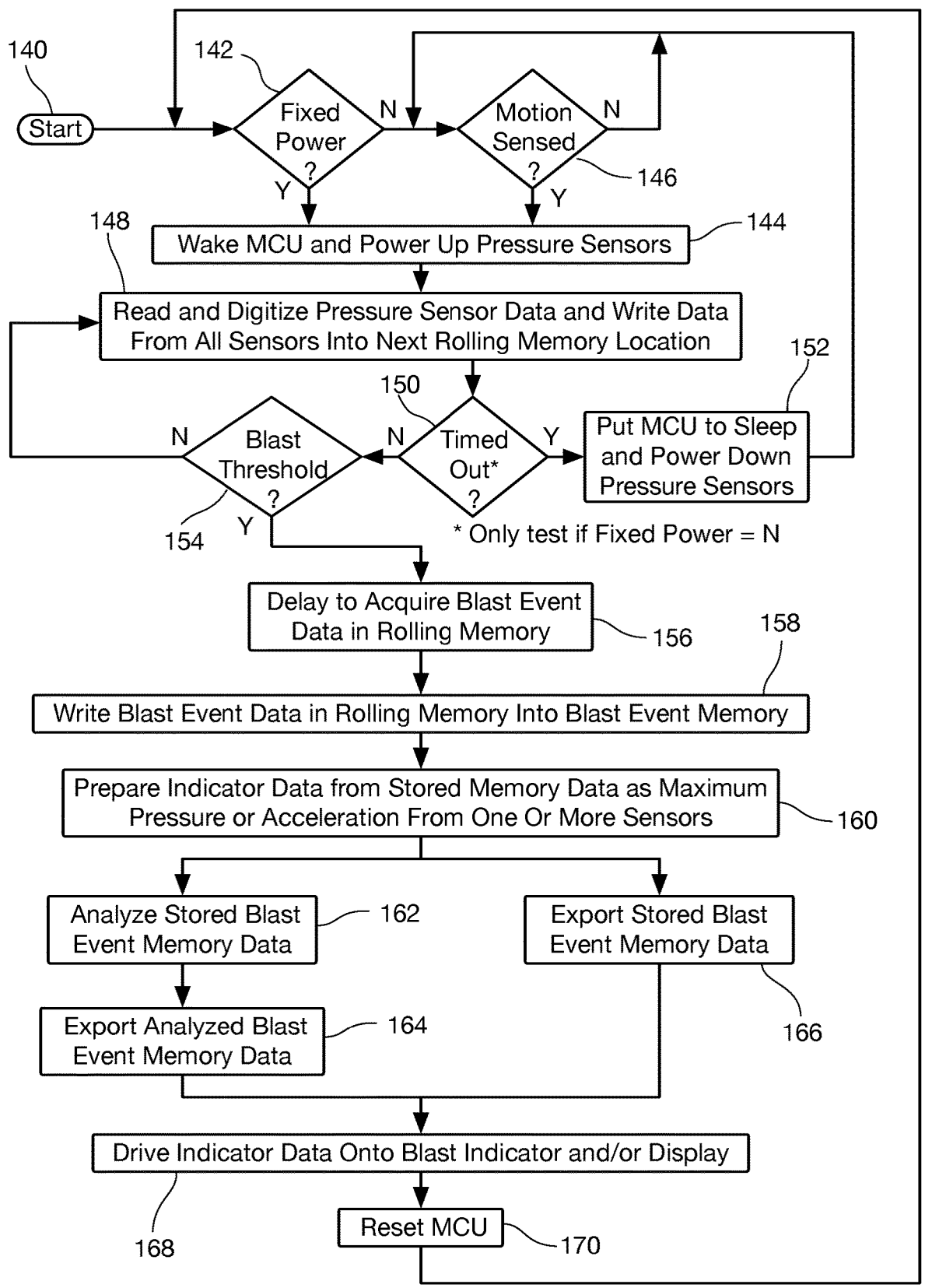
FIG. 8 is a flow diagram that shows in more detail the operation of an illustrative instance of the universal blast sensor of the present invention.

Referring now to FIG. 8, a flow diagram shows in more detail the operation of an illustrative instance of the wearable UBS 10 of the present invention. All events depicted in FIG. 8 take place inside of the wearable UBS 10. The operation begins at reference numeral 140.

At reference numeral 142, the wearable UBS 10 is examined to determine whether the wearable UBS 10 is in a fixed power mode where power is supplied by a fixed power source or by a battery source such as the one shown in FIG. 4. If at reference numeral 142 it is determined that the wearable UBS 10 is in a fixed power mode, operation proceeds to reference numeral 144 where the MCU 42 is awakened and power is provided to the pressure sensors. This mode of operation is particularly useful where the wearable UBS 10 is deployed on a fixed object such as a building or other structure where motion sensing is not available.

If at reference numeral 142 it is determined that the wearable UBS 10 is not in a fixed power mode, operation proceeds to reference numeral 146, where the motion sensor (e.g., the accelerometer 90 and/or the gyroscope 114 in FIG. 5) is continuously polled (e.g., at 2K samples/sec in a non-limiting instance of the invention) to determine if motion has been sensed, indicating that the wearable UBS 10 is being worn by a user and should be activated. Once motion is sensed the operation proceeds to reference numeral 144 where the MCU is awakened and power is provided to the pressure sensors.

At reference numeral 148 analog pressure data is read from the pressure sensors and digitized, acceleration and orientation data is read from the accelerometer, and from the gyroscope 114, and magnetometer sensors 116 (if present), and the data is read at preset intervals into the next memory location in the rolling memory buffer 112. If at reference numeral 142 it has been determined that the wearable UBS 10 is not in a fixed power mode, the operation proceeds to reference numeral 150, where the amount of time that has elapsed since the last motion was sensed at reference numeral 146 is compared with a predetermined inactivity time threshold to determine whether the wearable UBS 10 is being worn and is still in use by a user. If the inactivity time threshold has been exceeded, the operation proceeds to reference numeral 152 where the pressure sensors are powered down and the MCU 72 is put to sleep. The operation then proceeds to reference numeral 146 where the motion sensor is again continuously polled to determine if motion has been sensed, indicating that the wearable UBS 10 is being worn by a user and is again in use and should be activated.

If at reference numeral 150 the inactivity time threshold has not been exceeded, or if at reference numeral 142 it has been determined that the wearable UBS 10 is in a fixed power mode, the operation proceeds to reference numeral 154 where the data from each pressure sensor is compared with a preset threshold to determine if a blast event has occurred. If a blast event has occurred, the operation moves to reference numeral 156 where a delay long enough for the blast event data to be acquired by the rolling memory 112 is observed. In accordance with non-limiting instances of the invention, the delay may be from about 25 mSec to about 1 sec.

The operation then proceeds to reference numeral 158 where the contents of the rolling memory 112 are written into the blast event memory 102. As shown in FIG. 5, the range of memory locations written from the rolling memory buffer 112 into the blast event memory 102 starts at a memory location storing pressure data at a time prior to the blast threshold being detected at reference numeral 154. This assures that the rising edge of the blast pressure wave will be captured by the blast event memory 102. In the non-limiting example of FIG. 5, about 5 mSec of pre-blast pressure data is shown as having been transferred to the blast event memory 102.

The operation then proceeds to reference numeral 160 where indicator data of maximum pressure from one or more sensors is prepared from the stored blast memory data. Next, depending on whether the analysis is to be performed by the MCU or by an external intelligence, the stored blast memory data is either analyzed internally by the analytics Engine 124 in the MCU at reference numeral 162 and then the analyzed data is exported to an external device, or is exported to an external engine for analysis at reference numeral 164, or exported to an external analytics engine at reference numeral 166.

Next, at reference numeral 168 the indicator data is driven to the blast indicator and/or onto the display. Finally, at reference numeral 170, the MCU is reset and the operation returns to reference numeral 142.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A wearable universal blast sensor, comprising:
   an underwater pressure sensing transducer;
   at least one blast parameter sensing transducer to measure a blast parameter from the blast other than pressure;
   an analog-to-digital converter having an analog input and a digital output, the analog input coupled to the underwater pressure sensing transducer and the blast parameter sensing transducer;
   a rolling memory buffer coupled to the digital output of the analog-to-digital converter;
   at least one controller coupled to the rolling memory buffer and configured to:
   store a time sequence of digital pressure signals from the digital output of the analog-to-digital converter;
   write into a blast event memory data from the rolling memory buffer including data corresponding to the blast event if one of the digital pressure signals exceeds a set first threshold;
   generate a first blast magnitude indicator signal if any of the digital pressure signals exceeds a second set threshold.

2. The wearable universal blast sensor of claim 1 further comprising:
   an in-air pressure sensing transducer, and wherein
   the analog input of the analog-to-digital converter is coupled to the in-air pressure sensing transducer.

3. The wearable universal blast sensor of claim 1 wherein:
   the pressure sensor device, the at least one blast parameter sensing transducer, the memory, the at least one controller are sealed within in a housing; and
   at least one attachment device is coupled to the housing for mounting on a person or object.

4. The wearable universal blast sensor of claim 3, wherein the housing is comprised of a single material, or a plurality of materials wherein the material surrounding the sensors has an acoustic impedance compatible with a medium in which the blast is being measured.

5. The wearable universal blast sensor of claim 3, wherein the controller is configured to generate the first blast magnitude indicator signal as a function of one of single sensor blast pressure, averaging blast pressure from a combination of some sensors or all pressure sensors on the device, and calculate a resultant pressure and directionality of the blast.

6. The wearable universal blast sensor of claim 3, wherein the controller is configured to generate the first blast magnitude indicator signal as a function of an artificial intelligence/machine learning algorithm based on parameters of the blast.

7. The wearable universal blast sensor of claim 1 further comprising at least one blast indicator responsive to the blast magnitude indicator signal to provide a visual, audible, or tactile indication of blast exposure magnitude.

8. The wearable universal blast sensor of claim 1 wherein the controller is further configured to generate a second blast magnitude indicator signal if any of the digital pressure signals exceeds a third set threshold.

9. The wearable universal blast sensor of claim 8 further including at least one blast indicator to provide a visual, audible, or tactile first indication of blast exposure magnitude in response to the first blast magnitude indicator signal and a visual, audible, or tactile second indication of blast exposure magnitude in response to the second blast magnitude indicator signal.

10. The wearable universal blast sensor of claim 8, further including at least one display to display blast exposure magnitude in response to the first blast magnitude indicator signal and blast exposure magnitude in response to the first blast magnitude indicator signal.

11. The wearable universal blast sensor of claim 10 wherein the at least one display further displays one of battery levels, or different states and/or modes of operation of the wearable blast sensor.

12. The wearable universal blast sensor of claim 1 further including at least one display to display at least one of blast exposure magnitude in response to the first blast magnitude indicator signal.

13. The wearable universal blast sensor of claim 12 wherein the at least one display further displays one of battery levels, or different states and/or modes of operation of the wearable blast sensor.

14. The wearable universal blast sensor of claim 1, wherein the controller is further configured to store measured blast pressure data in response to an artificial intelligence/machine learning algorithm processing parameters of a blast.

15. The wearable universal blast sensor of claim 1, wherein the at least one blast parameter sensing transducer is one of an accelerometer and a gyroscope.

16. The wearable universal blast sensor of claim 1 wherein the controller is configured to write into an internal blast event memory.

17. The wearable universal blast sensor of claim 1 wherein the controller is configured to write into an external blast event memory.

18. The wearable universal blast sensor of claim 17, further including circuitry to write into the external blast event memory using one of wireless or wired communication.

19. The wearable universal blast sensor of claim 1, wherein the controller is further configured to calculate a resultant pressure of the blast from analysis of the pressure history from the pressure sensing transducer contained in the pressure sensor device.

20. The wearable universal blast sensor of claim 1, wherein the MCU is configured to perform blast data analysis in response to sensing the blast event.

21. The wearable universal blast sensor of claim 1, further comprising:
   at least one activation sensor, the MCU configured to enter one of a low power mode and an operating mode in response to signals from the activation sensor.

22. A method for operating a wearable blast sensor having an underwater pressure sensing transducer for measuring blast pressure of a blast, comprising:
   affixing the wearable blast sensor to an object;
   continually sensing pressure data from the underwater pressure sensing transducer;
   continuously storing the sensed pressure data in a rolling memory buffer in the wearable blast sensor;

comparing in the wearable blast sensor the sensed data from the pressure sensor with a preset threshold;

identifying in the wearable blast sensor sensed data that exceeds the preset threshold as blast event data;

in response to identifying blast event data, writing a data set from the rolling memory buffer into a blast event memory in the wearable blast sensor, the data set including sensed data stored sequentially from a time prior to the blast event data to sensed data stored from a time after the blast event data.

23. The method of claim 22 further comprising:

examining in the wearable blast sensor the data set in the blast event memory to identify maximum pressure blast data; and providing an indicator if the maximum pressure blast data exceeds threshold.

24. The method of claim 22 further comprising analyzing the data set in the blast event memory to calculate at least one of the peak pressure and pressure impulse from all pressure sensors, or the resultant pressure of the blast with respect to the blast sensor.

* * * * *